United States Patent [19]

Young et al.

[11] 3,888,886
[45] June 10, 1975

[54] OXIDATION OF ALKANES TO MALEIC ANHYDRIDE USING PROMOTED VANADIUM-PHOSPHORUS CATALYST

[75] Inventors: Lewis B. Young, Kendall Park; Benjamin Weinstein, Morganville; Anthony T. Jurewicz, Kendall Park, all of N.J.

[73] Assignee: Mobil Oil Corporation, New York, N.Y.

[22] Filed: Apr. 17, 1974

[21] Appl. No.: 461,777

Related U.S. Application Data

[63] Continuation-in-part of Ser. No. 379,667, July 16, 1973, which is a continuation-in-part of Ser. No. 261,030, June 8, 1972, abandoned.

[52] U.S. Cl. .............. 260/346.8; 252/435; 252/437
[51] Int. Cl. .............................................. C07c 57/14

[58] Field of Search ............................. 260/346.8 A

*Primary Examiner*—Henry R. Jiles
*Assistant Examiner*—Bernard I. Dentz
*Attorney, Agent, or Firm*—Charles A. Huggett; Hastings S. Trigg

[57] ABSTRACT

There is provided an improved process for the vapor phase oxidation of alkanes to dicarboxylic acidanhydrides, particularly butane to maleic anhydride, which comprises using a vanadium-phosphorus-oxygen complex catalyst having a P/V atomic ratio of 0.5-2, promoted or modified with certain transition metals, preferably zirconium, chromium, iron or hafnium. Using these catalysts, the oxidation process can be carried out at lower temperatures and increased yield as compared to the unpromoted complex.

22 Claims, 1 Drawing Figure

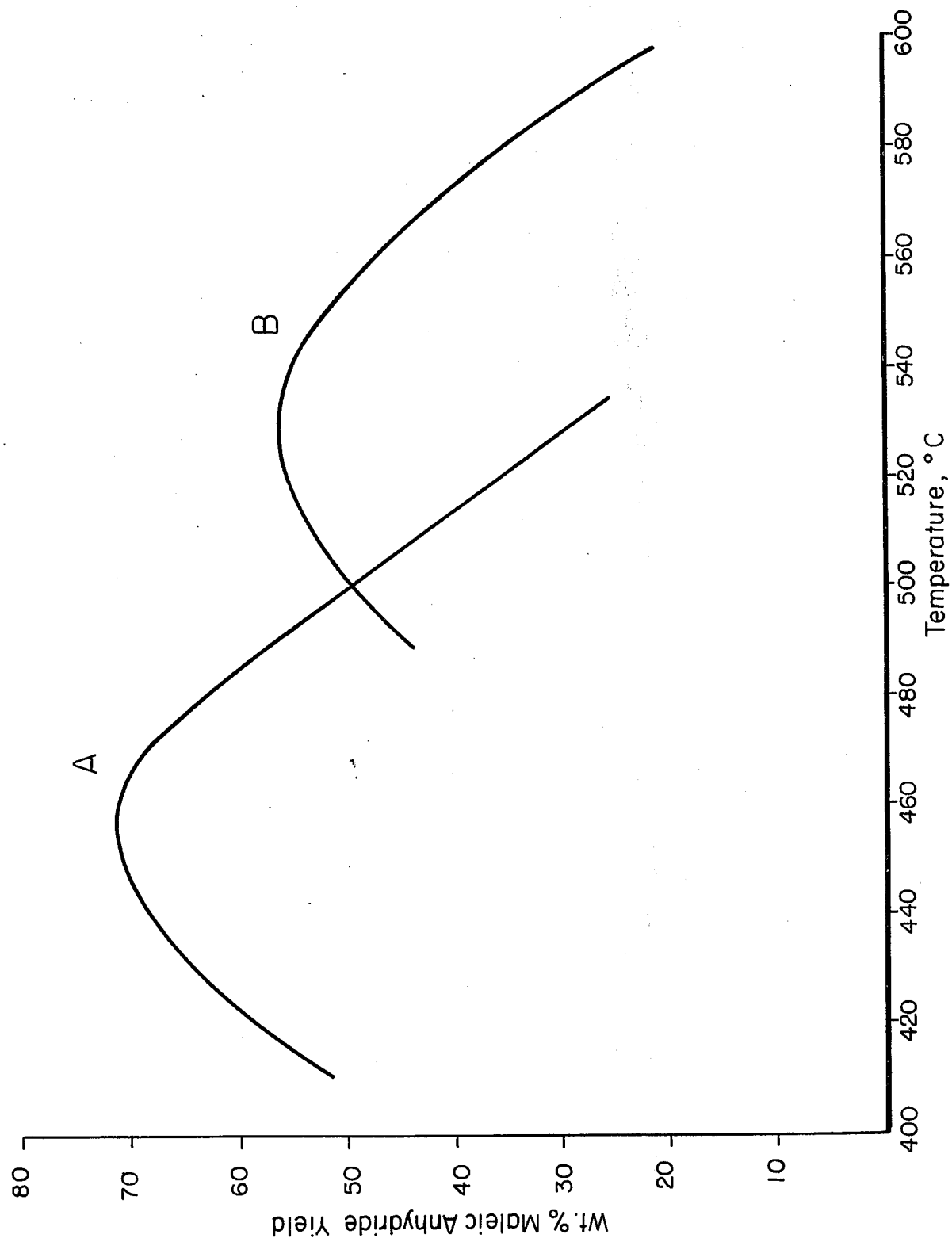

OXIDATION OF ALKANES TO MALEIC ANHYDRIDE USING PROMOTED VANADIUM-PHOSPHORUS CATALYST

CROSS-REFERENCE TO RELATED APPLICATIONS

This application is a continuation-in-part of copending application Ser. No. 379,667, filed July 16, 1973 which is a continuation-in-part of copending application Ser. No. 261,030, filed June 8, 1972 and now abandoned.

BACKGROUND OF THE INVENTION

1. Field of the Invention

This invention provides an improved catalytic process for the oxidation of alkanes and cycloalkanes to dicarboxylic acid anhydrides, particularly butane to maleic anhydride.

2. Description of the Prior Art

The use of a vanadium-phosphorus complex catalyst to oxidize butane to maleic anhydride has been described in U.S. Pat. No. 3,293,268. Such catalysts called for operating temperatures greater than 500°C. and, in general, yields were relatively low and not commercially attractive or feasible. Insofar as is now known, it has not been proposed to promote these catalysts with transition metals for use in the oxidation of butane or other alkanes.

Various catalysts have been proposed for the oxidation of olefins, such as butene, to dicarboxylic acid anhydrides such as maleic anhydride. It is well recognized in the art, however, that it is relatively easy to oxidize olefins to acid anhydrides in commercially feasible yields, i.e., yields of 60 weight per cent or better based upon the weight of the hydrocarbon feed. Yields of 60 weight per cent or better have not been noted in prior art processes for the catalytic oxidation of alkanes.

In U.S. Pat. No. 3,156,705, there is described a process for oxidizing an olefin (butene) to a dicarboxylic acid anhydride (maleic anhydride) using a metal promoted vanadium-phosphorus complex catalyst. It is taught that the promoter (called a "phosphorus stabilizer" by the patentee) can be an element selected from a wide variety of elements embracing the transition metals and the rare earth metals. It is the discovery of the present invention that, for the oxidation of alkanes (butane), commercially feasible yields of anhydride are achieved only when the promoter metal is selected from a small group of six metals (Cr, Fe, Hf, Zr, La, and Ce).

SUMMARY OF THE INVENTION

This invention provides an improved process for oxidizing alkanes or cycloalkanes to a dicarboxylic acid anhydride, that comprises contacting a mixture of a molecular oxygen-containing gas (air) and an alkane having between 4 and 10 carbon atoms, a cycloalkane having between 4 and 10 carbon atoms, or a mixture of hydrocarbons rich in alkanes and cycloalkanes having between 4 and 10 carbon atoms, at 300°–600°C., with a catalyst comprising vanadium, phosphorus and oxygen promoted with a metal selected from the group consisting of chromium, iron, hafnium, zirconium, lanthanum, and cerium; the atomic ratio of phosphorus/vanadium being between about 0.5 and about 2; and the atomic ratio of promoter metal/vanadium being between about 0.0025 and about 1. Such catalysts include promoted vanadium-phosphorus catalysts that are complex reaction products of a vanadium oxysalt and phosphoric acid.

DESCRIPTION OF THE DRAWING

The drawing presents curves showing the relationship between weight per cent maleic anhydride based upon weight of butane feed and the hotspot temperature based upon typical oxidation runs using vanadium-phosphorus catalysts without promoter, Curve B, and with hafnium promoter, Curve A.

DESCRIPTION OF SPECIFIC EMBODIMENTS

The charge stocks utilizable in the process of this invention are alkanes having between 4 and 10 carbon atoms, cycloalkanes having between 4 and 10 carbon atoms, or mixtures of hydrocarbons rich in alkanes and cycloalkanes having between 4 and 10 carbon atoms. The alkanes can be normal alkanes or they can have slight branching. Typical alkanes are butane, pentane, isopentane, hexane, isohexane, 3-methylpentane, heptane, octane, isooctane, and decane. The cycloalkanes utilizable can be methyl substituted and include cyclobutane, cyclopentane, methylcyclopentane, cyclohexane, methylcyclohexane, 1,4-dimethylcyclohexane, cycloheptane, and cyclooctane. Mixtures of hydrocarbons rich in alkanes and cycloalkanes having between 4 and 10 carbon atoms, i.e., containing about 70 weight per cent or more alkanes and cycloalkanes, are well known in the art. Particularly suitable and readily available mixtures are naphthas obtained from paraffinic or naphthenic petroleum sources. Full boiling range naphthas (boiling within the range of about 35°–230°C.) can be used but it is preferred to use light naphtha cuts boiling within the range of about 35°–145°C. The naphthas usually contain about 5–15 per cent benzene and alkylbenzenes. It has been found that benzene is oxidized to maleic anhydride in the process of this invention, whereas to some extent alkylbenzenes are oxidized to benzene carboxylic acids. It will be understood that other mixtures can be used, such as a paraffinic raffinate from the glycol-water solvent extraction of reformates (Udex process).

Butane, because of its ready availability, is preferred. In the following discussion and exemplification, therefore, butane is used in most examples to demonstrate (but not to limit) the present process for producing maleic anhydride. It is contemplated that mixtures rich in butane can be used, such as a typical butane-butene (B-B) refinery stream.

The promoted catalysts utilizable herein can be prepared by refluxing a reaction mixture of vanadium oxide, phosphoric acid, a hydrogen halide (usually hydrochloric acid), and a specified promoter metal compound. In place of $V_2O_5$, other vanadium compounds such as $VOCl_3$, $VO(NO_3)_3$, $NH_4VO_3$ and $VF_5$ can be used. Similarly, compounds hydrolyzable th phosphoric acid can be used, such as $P_2O_5$ and $POCl_3$. The hydrogen halides are HCl, HBr and HI. Alternatively, the promoter metal compound can be added at a later stage of the catalyst preparation. For example, the promoter metal compound can be added just prior to catalyst pelletization. The proportions of reactants are selected to afford an atomic ratio of phosphorus/vanadium of between about 0.5 and about 2 and an atomic ratio of promoter metal/vanadium of between about 0.0025 and about 1, preferably between about 0.005 and about 0.5.

The optimum atomic ratio of promoter metal/V will depend upon the particular metal selected. In general, the best ratio can be found from the specific working examples, infra, or can be readily determined with a minimum of experiments. For example, a ratio of 0.1 cerium is less effective as compared to a ratio of 0.013, but in the case of hafnium a ratio of 0.088 is better than 0.032. With iron, a middle ratio appears more effective.

The reaction mixture is heated at reflux temperature for between about 0.5 hour and about 24 hours, during which time the solution changes color, usually from brown to dark blue. Then, the reaction mixture is concentrated and evaporated to dryness. The catalyst is prepared by grinding the resultant solid material to about 20-60 mesh size and pelletizing, for example, to ⅛ inch × 5/32 inch cylindrical pellets. Optionally, a binder, such as stearic acid, can be added before pelletizing. Alternatively, the reaction mixture or a concentrate thereof can be used to impregnate a suitable carrier, such as alumina or alundum, silica, silicon carbide, silica-alumina, zeolite, zirconium phosphate and/or zirconia, to produce a supported catalyst suitable for use in a fixed or fluidized bed reactor. As a further alternative, the dried catalyst (unsupported) can be ground to produce a powdered catalyst for use in a fluidized bed reactor.

In practice, the vanadium salt is added as vanadium oxychloride, which is formed by reaction in situ of vanadium pentoxide with hydrochloric acid. Alternatively, other oxyhalide salts of vanadium can be used, suitably prepared by reacting vanadium pentoxide with another acid such as hydrobromic or hydriodic. The phosphoric acid used generally will have a strength of between about 25 per cent and about 100 per cent. The promoter metal compound can be any compound of the promoter metal, such as nitrate, chloride, acetate, oxide, carbonate and the like. The promoter metals utilizable in the catalysts contemplated herein are chromium, iron, hafnium, zirconium, lanthanum, and cerium. Iron and hafnium are particularly preferred for fixed bed operations, while zirconium is preferred for fluid bed operations. Zirconium generally provides a more active catalyst which provides higher yields of desired product (e.g. maleic anhydride) at lower activity temperatures in fluid bed operations. The zirconium-promoted catalysts are generally harder, such that they have improved resistance to attrition as compared with the corresponding unpromoted catalysts and with the corresponding catalysts promoted with other metals.

In some of the earlier work in the process of this invention, the catalyst was "conditioned" in the reactor by passing a hydrocarbon-air mixture through the catalyst bed at reaction temperature or approximately reaction temperature prior to running the oxidation reaction. Such conditioning is, however, not necessary to obtain catalyst efficiency. In this regard, note Examples 10 and 11. In practice, anhydride product can be obtained upon commencing the flow of oxidation feed through the reactor.

The oxidation of n-butane (or other alkane) to maleic anhydride (or other anhydride) is carried out using air or other molecular oxygen-containing gases, such as mixtures of carbon dioxide and oxygen or mixtures of nitrogen or steam with air or oxygen. Air is preferred. The oxidation reaction is carried out at temperatures of 300° – 600°C. Preferably, it is carried out at temperatures of 350°–550°C. The feed concentration will be 0.5-6 volume percent butane in the oxygen-containing gas and preferably 1-5 volume per cent. The contact time will vary between about 0.08-3 seconds, preferably about 0.16-1.6 seconds for fixed bed operation. Contact times of for example up to 30 seconds may be used in the case of a fluidized bed operation. Thus contact time, depending upon the type of operation will be about 0.08-30 seconds. Although the reaction can be carried out at 0.5-20 atmospheres pressure (absolute), it is preferably carried out at substantially atmospheric pressure, e.g., about 1-7 atmospheres pressure (absolute).

The reaction can be carried out in any suitable reactor for effecting vapor phase oxidation reactions. Suitably and preferably, a fixed catalyst bed can be employed. The reaction can be carried out, however, by using smaller catalyst particles in a fluidized reactor bed. In the most of following examples, except as noted, there was used a fixed-bed reactor consisting of 14 × ¾ inch i.d. stainless steel tube equipped with a ¼ inch o.d. axial thermowell for temperature measurement. A 12 inch portion of the reactor was encased in a brass block. Temperatures were measured at the hottest point in the catalyst bed and in the brass block. Heat was supplied to the reactor through tubular electrical heaters.

In the examples and tables, "percent of MA" indicates maleic anhydride yield expressed as weight per cent based upon the weight of butane feed and was determined by titration. The flow rates of air and butane were measured at room temperature and pressure. Temperatures are designated as "hotspot" for the temperature measured at the hottest point in the axial thermowell or "jacket" for the temperature of the brass block. Unless otherwise specified, all temperatures in Examples 1-10 are hotspot temperatures.

EXAMPLE 1

A vanadium-phosphorus catalyst having a P/V ratio of 1.06:1 (atomic ratio) was prepared as follows: 258 grams of $V_2O_5$ was added to a solution of 393 grams of 85 per cent $H_3PO_4$ and 2 liters of concentrated (37 percent by wt.) HCl. The mixture was refluxed for 2 hours during which time the solution changed color from brown to dark blue. The solution was concentrated until viscous and dried under vacuum at 100°C. for 17 hours. The resulting blue-green solid was ground to 20-60 mesh. To 80 g. of this solid, 10 per cent by weight stearic acid was added as binder, and the material was formed into ⅛ inch × 5/32 inch cylindrical pellets.

The catalyst was charged to the reactor at room temperature and butane and air were passed over the catalyst at 20 ml. per minute and 2000 ml. per minute, respectively. The reactor was heated at 490°C. for about 16 hours.

A mixture of 20 ml. per minute butane and 2000 ml. per minute air was then passed over the catalyst at 490°C. Maleic anhydride product was determined by scrubbing the exit gases through water followed by titration of an aliquot of the aqueous solution. In successive one hour sampling periods, MA yields of 46 and 44 per cent were obtained. Some further examples of MA yields obtained at other flow rates are given in Table I.

EXAMPLE 2

A catalyst having a P/V/Hf ratio (atomic) of 1.25/1/0.030 was prepared as follows: 258 grams of $V_2O_5$ was added to a solution of 393 g. of 85 per cent $H_3PO_4$ and 2 liters concentrated (37 percent by wt.) HCl. The mixture was refluxed for 2 hours during which time the $V_2O_5$ dissolved and the solution changed from brown to blue-green. 29.1 g. of $HfCl_4$ was added and the solution was stirred for one more hour. The resulting solution was concentrated, dried under vacuum at 110°C., ground to pass 40 mesh, and pelletized to 1/8 inch × 5/32 inch using 5 per cent stearic acid as binder.

70 ml. of the catalyst was charged to the reactor and heated overnight at 490°C. with a flow of 10 ml. per minute butane and 1000 ml. per minute air passing over it.

A mixture of 10 ml. per minute butane and 1000 ml. per minute air was then passed over the catalyst at 490°C. and the maleic anhydride yield was determined as in Example 1. In two successive one-hour sampling periods the maleic anhydride yields were 69 and 73 per cent based on butane feed.

Further comparisons between this catalyst and the unmodified V/P catalyst of Example 1 are summarized in Table I.

TABLE I

| Air ml./min. | Butane ml./min. | Temp. °C. | Wt. % MA per pass Example 1 | Example 2 |
|---|---|---|---|---|
| 1000 | 10 | 490 | 46 | 71 |
| 2000 | 20 | 410 | — | 51 |
| | | 430 | — | 63 |
| | | 450 | — | 71 |
| | | 470 | — | 71 |
| | | 490 | 44 | 54 |
| | | 510 | — | 44 |
| | | 525 | 56 | — |
| | | 530 | — | 27 |
| | | 550 | 52 | — |
| | | 575 | 32 | — |
| | | 600 | 24 | — |
| 2000 | 40 | 410 | — | 41 |
| | | 430 | — | 49 |
| | | 450 | — | 63 |
| | | 470 | — | 64 |
| | | 490 | 39 | 61 |
| | | 510 | — | 61 |
| | | 525 | 52 | — |
| | | 530 | — | 52 |
| | | 550 | 52 | — |
| | | 575 | 49 | — |
| | | 600 | 34 | — |

It will be apparent from the data in the Table that greater yields of maleic anhydride are obtained at less severe conditions when using the hafnium-promoted catalyst of Example 2. The difference between promoted and unpromoted catalyst becomes more apparent upon reference to the drawing. The curves in the drawing show the relationship between temperature and yield of maleic anhydride based upon the data in Table I using an air flow rate of 2000 ml. per minute and a butane flow rate of 20 ml. per minute. Curve A shows this relationship using the hafnium-promoted catalyst of Example 2. Curve B shows this relationship when using the unpromoted catalyst of Example 1. It will be noted (Curve A) that significantly higher yields of MA are obtained at substantially lower temperatures when the promoted catalyst is used.

EXAMPLE 3

A catalyst having a P/V/Hf atomic ratio of 1.21/1/0.058 (about twice as much hafnium as the catalyst in Example 2) was prepared as follows: a mixture of 97 g. $V_2O_5$ and 1.5 liter concentrated HCl (37 per cent by wt.) was refluxed for 4 hours. 147.3 g. 85 per cent $H_3PO_4$ was then added and the solution was refluxed for 16 hours more. 21.8 $HfCl_4$ was then added and refluxing continued for one hour. The solution was then treated as described in Example 1 and 2 to produce the finished catalyst.

70 ml. of the catalyst was charged to the fixed-bed reactor already described and heated for one day at 462°C. under a flow of 2000 ml./min. air and 10 ml./min. butene for about 2 hours and then the butene was replaced with butane. After 15 days operation with varying conditions of temperature and air and butane flows, butane and air were passed over the catalyst at 40 ml./min. and 2000 ml./min., respectively at a reactor temperature of 490°C. The maleic anhydride yield under these conditions was 73 per cent. The V/P/Hf catalyst of Example 2 produced 58–64 per cent MA under these conditions. The v/P catalyst of Example 1 produced 39 per cent MA under these conditions.

EXAMPLE 4

The general procedure of Example 3 was repeated. Seventy ml. of a catalyst having an atomic ratio of phosphorus/vanadium/zirconium of 1.2/1/0.148 was used (zirconium added as zirconyl acetate). At a reactor temperature of 509°C. and butane and air flows of 30 ml./min. and 1000 ml./min., respectively, the yield of maleic anhydride was 71 per cent. At a reactor temperature of 499°C. and butane and air flows of 45 ml./min. and 1500 ml./min., respectively, the yield of maleic anhydride was 64 per cent.

EXAMPLE 5

The general procedure of Example 3 was repeated. Seventy ml. of a catalyst having an atomic ratio of phosphorus/vanadium/cerium of 1.2/1/0.013 was used (cerium added as ceric ammonium nitrate). At a reactor temperature of 490°C. and butane and air flows of 19 ml./min. and 1000 ml./min., respectively, the maleic anhydride yield was 81 per cent. At a reactor temperature of 520°C. and butane and air flows of 70 ml./min., and 3500 ml./min., respectively, the maleic anhydride yield was 52 per cent.

EXAMPLE 6

The general procedure of Example 3 was repeated. Seventy ml. of a catalyst having an atomic ratio of phosphorus/vanadium/iron of 1.2/1/0.03 was used (iron added as iron [III] oxide). At a reactor temperature of 508°C. and butane and air flows of 41 ml./min. and 2000 ml./min., respectively, the yield of maleic anhydride was 69 per cent. At a reactor temperature of 538°C. (jacket temperature was 460°C.) and butane and air flows of 62.5 ml./min. and 2000 ml./min., respectively, the maleic anhydride yield was 73 per cent.

EXAMPLE 7

A catalyst having a phosphorus/vanadium atomic ratio of 1.2/1 was prepared according to the general procedure of Example 3. After the catalyst was dried, 0.2 weight per cent iron (as iron oxide) was added and the catalyst was formed into pellets. Over 70 ml. of the catalyst at a temperature of 490°C. was passed 10 ml./min. butane and 1000 ml./min. air. The maleic anhydride yield was 73 per cent. At a reactor temperature of 510°C. and butane and air flow rates of 40 ml./min. and 2000 ml./min., respectively, the maleic anhydride yield was 56 per cent.

It is apparent from this Example and previous Examples that the promoter may be added with benefit at different stages of the catalyst preparation.

EXAMPLE 8

The catalyst of Example 2 was ground to a powder (approximately 100 mesh), and 70 ml. was placed in a fluid bed type of reactor comprising a glass tube about 18 inches long and having an inside diameter of about 1 inch. A mixture of 30 ml./min. butane and 1200 ml./min. air was passed upwardly through the reactor with the bed temperature at 480° – 500°C. The yield of maleic anhydride was 59 per cent.

EXAMPLE 9

Four catalysts were prepared in an identical fashion using the method described in Examples 1–3. The catalysts were deposited on a silica-alumina support. Vanadium pentoxide and phosphoric acid were used in quantities such that the catalyst contained 11 per cent $V_2O_5$ and 10 per cent $P_2O_5$ by weight. One catalyst contained only V and P; another contained 1 per cent Ce (added as $Ce[NO_3]_3$) in addition to V and P; another contained 0.9 per cent Sm (added as $Sm[OAc]_3$) in addition to V and P; the fourth contained 0.8 per cent Hf (added as $HfCl_4$) in addition to V and P.

The catalysts were evaluated as described above. The unmodified V/P catalyst produced an average MA yield of 34 per cent from n-butane. The cerium modified V/P catalyst gave an average MA yield of 46 per cent. The samarium and hafnium modified catalysts gave average MA yields of 49 per cent and 47 per cent, respectively, from n-butane.

EXAMPLE 10

The catalyst described in Example 2 was charged to the reactor. Then, the reactor was rapidly heated to 500°C. (jacket temperature) while 1000 ml./min. air was passed through the catalyst bed. A mixture of 20 ml./min. butane and 2000 ml./min. air was then passed in contact with the catalyst at a bed (hotspot) temperature of 490°C. and MA yield determined as in Example 1. In two successive hourly sampling periods the MA yields were 63 per cent and 66 per cent based on weight of butane feed. This run demonstrates that prior conditioning of the catalyst is not necessary and is not critical for good catalyst performance.

As has been indicated hereinbefore, U.S. Pat. No. 3,156,705 teaches that olefins can be oxidized to maleic anhydride in good yields using virtually all transition metals and rare earth promoters for the V/P catalyst. The following example sets forth the results of a series of runs with various promoters, which shows that in the oxidation of alkanes (butane) only certain promoters are effective to produce MA from butane in commercially feasible yields (60 wt. per cent or better).

EXAMPLE 11

A number of series of runs were made to oxidize butane to MA, using V/P catalysts having different promoter metals in each series. In each series of runs, temperature was varied from run to run using in all runs a feed of 2 volume per cent butane in air and a feed rate space velocity of 4.54 lb. moles/ft.$^3$/hr. After a temperature series was run for each promoter, the optimum temperature for optimum MA yield was determined. The pertinent data of promoter metal, promoter/V atomic ratio, temperature, and yield per pass are set forth in Table II. The temperatures shown are jacket temperatures corresponding to average bed temperature, unless otherwise indicated in Table II. The Table is divided as to commercially feasible yields in the first portion and to yields not commercially feasible in the second (lower) portion.

TABLE II

| Promoter | Atomic Ratio Promoter/V | Temp., °C. | Wt. % MA Per Pass |
|---|---|---|---|
| Cr | 0.031 | 480 | 79 |
| Fe | 0.031 | 470 | 76 |
| Hf | 0.088 | 415 | 73 |
| Zr | 0.072 | 460 | 66 |
| Ce | 0.013 | 450 | 64 |
| Fe | 0.056 | 455 | 64 |
| Hf | 0.032 | 490* | 64 |
| La | 0.03 | 480 | 63 |
| Fe | 0.014 | 530* | 61 |
| Mn | 0.03 | 500 | 59 |
| Zn | 0.03 | 512 | 59 |
| Ru | 0.01 | 420 | 58 |
| Mo | 0.03 | 460 | 56 |
| Sn | 0.03 | 498 | 54 |
| Ti | 0.03 | 460 | 54 |
| Sb | 0.03 | 512 | 54 |
| Th | 0.03 | 490 | 52 |
| Pr | 0.03 | 465 | 52 |
| None | — | 470 | 52 |
| W | 0.03 | 480 | 51 |
| Ce | 0.10 | 450 | 49 |
| Sm | 0.03 | 460 | 49 |
| Ag | 0.03 | 485 | 49 |
| Nb | 0.03 | 510 | 47 |
| Ni | 0.03 | 535 | 46 |
| Tl | 0.03 | 495 | 44 |
| U | 0.03 | 502 | 42 |
| Cu - Li | 0.024–0.072 | 480 | 41 |
| Co | 0.03 | 500 | 39 |

*Hottest temperature in bed.

EXAMPLE 12

A catalyst was prepared by the procedure described in Example 3 and has the same composition as that employed in Example 4 (phosphorus/vanadium/zirconium atomic ratio 1.2/1/0.148). The catalyst was ground to a powder of 74 – 250 micron size. Catalyst powder (100 ml.) was placed in a fluid bed type of reactor comprising a glass tube about 18 inches long and having an inside diameter of about 1 inch. A mixture of 20 ml./min. of n-butane and 500 ml./min. of air was passed upwardly through the reactor with the bed temperature at 400°C. The contact time was 5 seconds. The yield of maleic anhydride was 83 per cent by weight at 80 per cent n-butane conversion.

The following examples present data for the oxidation of hydrocarbons other than butane. There are also examples of oxidizing mixtures of hydrocarbons rich in alkanes and cycloalkanes.

EXAMPLE 13

Into the fluid bed reactor described in Example 12 was placed 100 ml. of a catalyst having a phosphorus/vanadium/zirconium atomic ratio of 1.2/1/0.13. Each of a variety of pure hydrocarbons admixed with air was passed upwardly through the reactor at a gas hourly space velocity (GHSV = volume gas fed at room temperature and pressure/catalyst volume/hr.) of $735/hr.^{-1}$. In each run, the hydrocarbon : air ratio (mole/mole) and the reactor temperature were different. Pertinent data on run conditions and yield of maleic anhydride (MA) for each run are set forth in Table III.

TABLE III

| Hydrocarbon | HC/Air, Molar | Temp., °C. | MA Yield, Wt. % |
|---|---|---|---|
| n-Pentane | 1.55 | 425 | 74 |
| Isopentane | 1.60 | 450 | 42 |
| Cyclopentane | 2.54 | 400 | 84 |
| n-Hexane | 1.83 | 400 | 65 |
| Isohexane | 1.8 | 425 | 66 |
| 3-Methylpentane | 1.8 | 425 | 63 |
| Methylcyclopentane | 2.13 | 400 | 67 |
| Cyclohexane | 2.21 | 450 | 70 |
| n-Octane | 1.47 | 400 | 46 |
| Benzene | 2.69 | 425 | 68 |
| Toluene | 2.25 | 375 | 18* |
| Ethylbenzene | 2.0 | 375 | 28* |
| o-Xylene | 2.0 | 375 | 56** |

*Benzoic Acid
**Phthalic Anhydride

EXAMPLE 14

Into bottom of the fluid bed reactor used in Example 13 containing 100 ml. of a catalyst having a phosphorus/vanadium/zirconium atomic ratio of 1.2/1/0.13, was passed light Arabian naphtha and air in a HC/air molar ratio of about 1.65/100 at a GHSV of 735 hr.$^{-1}$. This naphtha was a cut boiling at $C_5$ to 290°F. (143°C.), with an average molecular weight of about 100 and an average carbon number of 7. It contained about 70 wt. percent paraffins, 18 wt. percent monocycloparaffins, <1 wt. percent olefins, and 12 wt. percent alkylbenzenes. At a reaction temperature of 425°C. the yield of MA was 58 wt. percent.

EXAMPLE 15

The run of Example 14 was repeated except that the hydrocarbon charge stock was a Udex raffinate (from the glycol-water solvent extraction of a reformate). This boiled at $C_5$ to about 291°F. (144°C.), with an average molecular weight of about 93 and an average carbon number of 6.5. It contained about 89 wt. percent paraffins, 5 wt. percent cycloparaffins, nil (<0.5 wt. percent) olefins, and 6 wt. percent alkylbenzenes. At a reaction temperature of 425°C. the yield of MA was 54 wt. percent.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An improved process for oxidizing an alkane or cycloalkane to maleic anhydride, that comprises contacting a mixture of a molecular oxygen-containing gas and an alkane having 4–10 carbon atoms, a cycloalkane having between 4 and 10 carbon atoms, or a mixture of alkanes and cycloalkanes having between 4 and 10 carbon atoms at a temperature of about 300°–600°C., with a catalyst consisting essentially of vanadium, phosphorus and oxygen promoted with a metal selected from the group consisting of chromium, hafnium, zirconium, lanthanum, and cerium; the atomic ratio of phosphorus/vanadium being between about 0.5 and about 2; and the atomic ratio of promoter metal/vanadium being between about 0.0025 and about one.

2. The process of claim 1, wherein said oxygen-containing gas is air, said temperature is about 350°–550°C., and said atomic ratio of promoter metal/vanadium is between about 0.005 and about 0.5.

3. The process of claim 2, wherein said alkane is butane.

4. The process of claim 2, wherein said alkane is pentane.

5. The process of claim 2, wherein said cyloalkane is cyclopentane.

6. The process of claim 2, wherein said alkane is hexane.

7. The process of claim 2, wherein said cycloalkane is methylcyclopentane.

8. The process of claim 2, wherein said cycloalkane is cyclohexane.

9. The process of claim 2, wherein said mixture is naphtha.

10. The process of claim 9, wherein said naphtha is a light naphtha.

11. The process of claim 2, wherein said promoter metal is zirconium.

12. The process of claim 2, wherein said promoter metal is hafnium.

13. The process of claim 2, wherein said promoter metal is chromium.

14. The process of claim 2, wherein said promoter metal is cerium.

15. The process of claim 11, wherein said alkane is butane.

16. The process of claim 11, wherein said alkane is pentane.

17. The process of claim 11, wherein said cycloalkane is cyclopentane.

18. The process of claim 11, wherein said alkane is hexane.

19. The process of claim 11, wherein said cycloalkane is methylcyclopentane.

20. The process of claim 11, wherein said cycloalkane is cyclohexane.

21. The process of claim 11, wherein said mixture is naphtha.

22. The process of claim 21, wherein said naphtha is a light naphtha.

* * * * *

UNITED STATES PATENT AND TRADEMARK OFFICE
CERTIFICATE OF CORRECTION

PATENT NO. : 3,888,886
DATED : June 10, 1975
INVENTOR(S) : LEWIS B. YOUNG, BENJAMIN WEINSTEIN and
ANTHONY T. JUREWICZ It is certified that error appears in the above-identified patent and that said Letters Patent are hereby corrected as shown below:

Col. 2, line 59           "th" should be --to--.

Signed and Sealed this

Third Day of August 1976

[SEAL]

Attest:

RUTH C. MASON
Attesting Officer

C. MARSHALL DANN
Commissioner of Patents and Trademarks